Nov. 14, 1961 L. P. MEISSNER 3,009,114

FREQUENCY DOMAIN SWITCH

Filed Feb. 13, 1957

INVENTOR.
LOREN P MEISSNER
BY
G. D. O'Brien
V. C. Muller
ATTORNEYS 3,009,114
FREQUENCY DOMAIN SWITCH Loren P. Meissner, Corona, Calif., assignor to the United States of America as represented by the Secretary of the Navy Filed Feb. 13, 1957, Ser. No. 640,060
2 Claims. (Cl. 331—38)
(Granted under Title 35, U.S. Code (1952), sec. 266)

Figure 1:
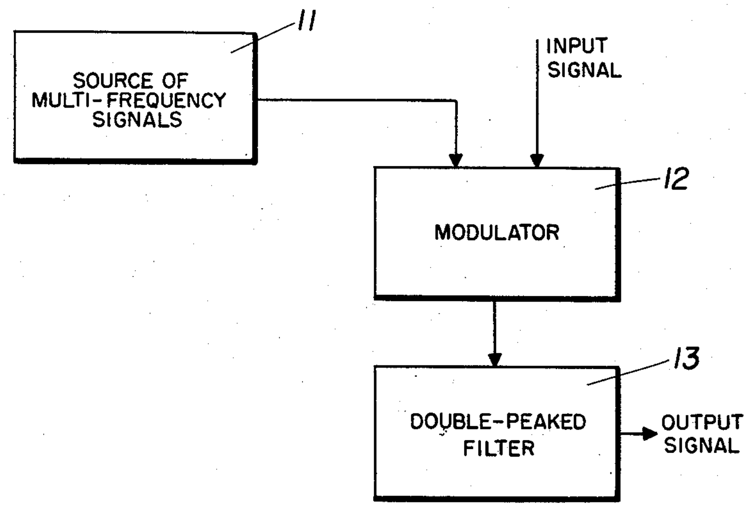

The invention described herein may be manufactured and used by or for the Government of the United States of America for governmental purposes without the payment of any royalties thereon or therefor.

This invention relates to a frequency domain switch and more particularly to improved electronic circuits adapted to produce an oscillatory output signal at one of two or more different frequencies, the choice between the two frequencies being made on the basis of the frequency of the input signal.

One prior method for accomplishing somewhat the same function as the present invention is a circuit described in Technical Report Number 19, "Registers and Counters Based on Frequency Memory," by Murray I. Disman, Electronics Research Laboratory, Stanford University. The prior device in the particular form described therein is subject to the assumption that the two subsets are exhaustive; that is, any possible input signal frequency is a member of one subset or the other. Thus, it is sufficient to examine the input frequency with regard to only one subset, and if it is not found to be in that subset, it may be assumed to be in the other subset by default.

In the prior circuit a filter is used which will pass the input signal if, and only if, its frequency is in the subset which is under examination. The presence of an oscillatory signal of non-zero amplitude at the output of this filter therefore indicates that the input frequency is a member of the subset. A detector at the output of this filter produces a non-oscillating voltage proportional to the amplitude of the filtered oscillatory signal. This voltage operates a switch which gates the signal from one of two oscillators into the output, the choice between the local oscillators being made on the basis of the level of the voltage from the detector.

The principal disadvantage of the device described above lies in the need for a detector and a voltage-level-controlled switch. This disadvantage does not materially affect the over-all operation of the device at frequencies below the microwave range up to several megacycles where such detectors and switches are feasible. At higher frequencies, on the other hand, these detectors and switches will impose serious limitations on the speed and efficiency of the entire system. Furthermore, this prior system does not provide a positive selection of more than one subset, since it positively selects only one subset and the other subset covers all other frequencies by default.

One preferred embodiment of the present invention consists essentially of a double-peaked filter which will pass either of the two desired output frequencies, a modulator or mixer, and a multifrequency signal source which is mixed with the input signal and applied to the modulator. The multifrequency signal contains components whose frequency is the difference between the possible input frequencies and the corresponding desired output frequencies. The double-peaked filter removes all extraneous signals except for the desired output signals.

One object of the present invention is to provide a frequency domain switch which operates entirely in the frequency domain, and hence is not subject to the speed and efficiency limitations of time domain switching.

Another object of the present invention is to provide a frequency domain switch wherein the number of subsets of input frequencies need not be restricted to two.

A further object of the present invention is to provide an electronic circuit for producing an oscillatory output signal at one of two different frequencies with the choice between the two frequencies being made on the basis of the frequency of the input signal and without requiring the use of a detector and a voltage level controlled switch.

Still another object of the present invention is to provide a frequency domain switch which positively selects only one subset from two or more possible subsets of input frequencies.

A still further object of the present invention is to produce an oscillatory output signal at one of two different frequencies by the direct generation of the output signal by frequency mixing instead of by switching and local oscillators.

Figure 2:
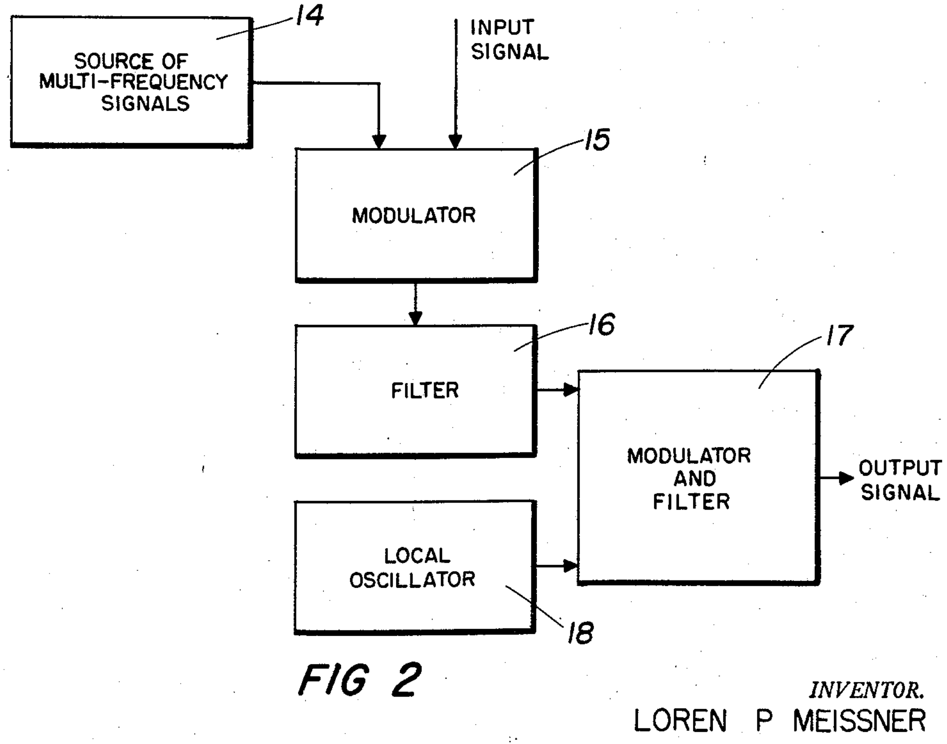

Other objects and many of the attendant advantages of this invention will be readily appreciated as the same becomes better understood by reference to the following detailed description when considered in connection with the accompanying drawings wherein:

FIG. 1 is a block diagram illustrating one preferred embodiment of the present invention; and FIG. 2 is a block diagram of one modification of the present invention for use where any possible input frequency is a member of one subset or the other, and the two subsets exhaust the set of possible input frequencies.

Referring now to the drawings in detail, one preferred embodiment of the present invention is illustrated in FIG. 1 wherein a source of multifrequency detection signals 11 is adapted to produce a signal which simultaneously contains all of a number of frequency components. Each frequency component is chosen to be the difference between one of the desired output frequencies and one of the frequencies of the corresponding subset of possible frequencies of the input signal.

The input signal as illustrated in FIG. 1 is mixed in the modulator 12 with one or more detection frequencies from a source of multifrequency signals 11. The modulator 12 will simultaneously combine the input signal with the components of the multifrequency signal, mixing these signals to produce beat frequencies. In particular, if the input signal contains a frequency from one of the subsets there will be a component of the multifrequency signal whose frequency is the difference between that of the input frequency and the corresponding one of the desired output frequencies. This component will combine with the input signal, and the desired output frequency will be present as one of the beat frequencies produced by the modulator 12.

The double peaked filter 13 will remove all the extraneous signals produced by all the other combinations of the input signal with the other components of the multifrequency signal, leaving only the desired output signal.

While the frequency domain switch of the present invention has many possible applications, one simple application is for detecting the presence of a carry in a binary adder of a frequency domain computer. The frequency domain switch of the present invention may also be utilized in a decimal adder in a different type of computer.

As a specific example, consider that each digit position of a binary number is either 0 or 1. When two numbers are added, the sum at each digit position, including carry from the next lower digit position, may be 0, 1, 2, or 3. A "carry" signal must be sent to the next higher digit position if this sum is 2 or 3, and a "no-carry" signal, which sometimes consists of the absence of a "carry" signal, must be sent if the sum is 0 or 1.

In a frequency domain adder, the possible sum digits 0, 1, 2 and 3 are represented by a set of equally spaced frequencies—for example, those shown in Table 1.

*Table 1.—Frequency allocation for binary adder*

| Digit: | Frequency allocated, mc. |
|---|---|
| 0 | 25 |
| 1 | 26 |
| 2 | 27 |
| 3 | 28 |

A signal at one of these four frequencies, representing the digits 0, 1, 2 or 3, will form the input to the frequency domain switch. This switch must detect whether, on one hand, the digit represented is 0 or 1 and a "no carry" signal is to be produced; or whether, on the other hand, the digit represented is 2 or 3 and a "carry" signal is to be produced.

This switch must deliver a "no carry" signal at one frequency if this input is 25 or 26 mc. and a "carry" signal at a different frequency if the input is 27 or 28 mc.

It really does not matter what the output of the device would be at other frequencies, since only these four possibilities can occur in normal use of the adder described in this specific example.

If the input signal is mixed with a multi-frequency signal having components at 10, 11 and 12 mc., the output of the mixing device will have the frequency components listed in Table 2.

*Table 2.—Modulator output frequencies for binary adder*

| Input, mc. | Component of multi-frequency detection signal | | |
|---|---|---|---|
| | 10 mc. | 11 mc. | 12 mc. |
| 25 | 35 | 36 | 37 |
| 26 | 36 | 37 | 38 |
| 27 | 37 | 38 | 39 |
| 28 | 38 | 39 | 40 |

Notice that each of the first two input cases (for which "no-carry" output signals are required) contains a 36 mc. output component, while each of the last two (for which "carry" outputs are needed) contains a 39 mc. component in its output. If all the other output components are suppressed, this will meet the requirement that the output must be at one frequency (36 mc.) if the input is 25 or 26 mc. and at a different frequency (39 mc.) if the input is at 27 or 28 mc. The easiest way to suppress the other components is to use a double-peaked filter, such as the one illustrated at 13, having one peak at 36 mc. and the other at 39 mc.

The modification of FIG. 2 illustrates a particular form of the invention which is adapted for use in case the two subsets exhaust the set of possible input frequencies so that any possible input frequency is a member of one subset or the other. A source of multifrequency signals 14 produces a number of frequencies which are mixed with the input signal in the modulator 15 and each of the multifrequency signal components from the source 14 corresponds to the difference between the response frequency of the filter 16 and one of the frequencies of the subset which is under examination. The filter 16 in this modification has only one peak at the frequency corresponding to the difference between the two desired output frequencies.

The output from the filter 16 is mixed in a modulator and filter 17 with the output from a local oscillator 18 to produce one of the two desired output signals depending on the frequency of the input signal.

In one specific example of the use of the modification of FIG. 2 in a decimal adder the possible inputs may be any one of certain discrete values, and the output will be at one frequency such as 30 kc. for input frequencies between 10 kc. and 19 kc. representing the digits 0 to 9 and at another frequency such as 44.5 kc. (30 kc.+14.5 kc.) for input frequencies between 20 kc. and 29 kc. representing the digits 10 to 19, as indicated in Table 3 below.

*Table 3.—Input, detection and output frequencies for decimal adder*

MULTI-FREQUENCY DETECTION SIGNAL

| Input | | Sum (kc.) | | | | | Difference (kc.) | | | | |
|---|---|---|---|---|---|---|---|---|---|---|---|
| Digit | f-kc. | 4.5 | 3.5 | 2.5 | 1.5 | 0.5 | 0.5 | 1.5 | 2.5 | 3.5 | 4.5 |
| 0 | 10 | 14.5 | 13.5 | 12.5 | 11.5 | 10.5 | 9.5 | 8.5 | 7.5 | 6.5 | 5.5 |
| 1 | 11 | 15.5 | 14.5 | 13.5 | 12.5 | 11.5 | 10.5 | 9.5 | 8.5 | 7.5 | 6.5 |
| 2 | 12 | 16.5 | 15.5 | 14.5 | 13.5 | 12.5 | 11.5 | 10.5 | 9.5 | 8.5 | 7.5 |
| 3 | 13 | 17.5 | 16.5 | 15.5 | 14.5 | 13.5 | 12.5 | 11.5 | 10.5 | 9.5 | 8.5 |
| 4 | 14 | 18.5 | 17.5 | 16.5 | 15.5 | 14.5 | 13.5 | 12.5 | 11.5 | 10.5 | 9.5 |
| 5 | 15 | 19.5 | 18.5 | 17.5 | 16.5 | 15.5 | 14.5 | 13.5 | 12.5 | 11.5 | 10.5 |
| 6 | 16 | 20.5 | 19.5 | 18.5 | 17.5 | 16.5 | 15.5 | 14.5 | 13.5 | 12.5 | 11.5 |
| 7 | 17 | 21.5 | 20.5 | 19.5 | 18.5 | 17.5 | 16.5 | 15.5 | 14.5 | 13.5 | 12.5 |
| 8 | 18 | 22.5 | 21.5 | 20.5 | 19.5 | 18.5 | 17.5 | 16.5 | 15.5 | 14.5 | 13.5 |
| 9 | 19 | 23.5 | 22.5 | 21.5 | 20.5 | 19.5 | 18.5 | 17.5 | 16.5 | 15.5 | 14.5 |
| 10 | 20 | 24.5 | 23.5 | 22.5 | 21.5 | 20.5 | 19.5 | 18.5 | 17.5 | 16.5 | 15.5 |
| 11 | 21 | 25.5 | 24.5 | 23.5 | 22.5 | 21.5 | 20.5 | 19.5 | 18.5 | 17.5 | 16.5 |
| 12 | 22 | 26.5 | 25.5 | 24.5 | 23.5 | 22.5 | 21.5 | 20.5 | 19.5 | 18.5 | 17.5 |
| 13 | 23 | 27.5 | 26.5 | 25.5 | 24.5 | 23.5 | 22.5 | 21.5 | 20.5 | 19.5 | 18.5 |
| 14 | 24 | 28.5 | 27.5 | 26.5 | 25.5 | 24.5 | 23.5 | 22.5 | 21.5 | 20.5 | 19.5 |
| 15 | 25 | 29.5 | 28.5 | 27.5 | 26.5 | 25.5 | 24.5 | 23.5 | 22.5 | 21.5 | 20.5 |
| 16 | 26 | 30.5 | 29.5 | 28.5 | 27.5 | 26.5 | 25.5 | 24.5 | 23.5 | 22.5 | 21.5 |
| 17 | 27 | 31.5 | 30.5 | 29.5 | 28.5 | 27.5 | 26.5 | 25.5 | 24.5 | 23.5 | 22.5 |
| 18 | 28 | 32.5 | 31.5 | 30.5 | 29.5 | 28.5 | 27.5 | 26.5 | 25.5 | 24.5 | 23.5 |
| 19 | 29 | 33.5 | 32.5 | 31.5 | 30.5 | 29.5 | 28.5 | 27.5 | 26.5 | 25.5 | 24.5 |

This modification has certain advantages in particular applications. One of these advantages is the ease with which the output frequencies may be changed merely by changing the output frequency of the local oscillator 18 and the filter associated with modulator 17 without changing all of the detection frequencies and other parts of the circuit.

In certain applications it is possible by careful selection to reduce the number of detection frequencies required to produce the output frequencies desired from any sets of inputs. In Table 3 the use of five detection frequencies to produce sum and difference frequencies of 14.5 kc. with 10 input signals reduces the number of detection signals required by one-half.

Using the circuit of FIG. 1 it is possible to use a single detection frequency of 0.5 kc. with input signal of 9.5, 10.5, 11.5 or 12.5 kc. representing the digits 1, 2, 3 and 4 respectively, to produce an output at 10 or 12 kc. as illustrated in Table 4 below.

| Digit | Input frequency | Detection frequency | Difference frequency | Sum frequency |
|---|---|---|---|---|
| 1 | 9.5 | 0.5 | 9.0 | 10.0 |
| 2 | 10.5 | 0.5 | 10.0 | 11.0 |
| 3 | 10.5 | 0.5 | 11.0 | 12.0 |
| 4 | 10.5 | 0.5 | 12.0 | 13.0 |

Obviously the frequencies listed in Table 3 could be utilized to produce outputs of 14.5 and 24.5 kc. in the circuit illustrated in FIG. 1.

Either of the circuits illustrated in FIGS. 1 and 2 could be utilized to examine random input frequencies which might be within any one of two or more continuous bands, and produce a different frequency output for each band. This would require a large number of closely spaced discrete detection signals and sharply peaked filters to separate the bands, particularly if they were closely adjacent in frequency.

Frequency-domain switches can be designed with characteristics somewhat different from those described in the foregoing description. Ordinarily, the set of all possible input frequencies would be divided into two mutually exclusive subsets, and one of two output frequencies would be produced, depending upon which subset contained the input frequency in any particular instance. Most commonly, and especially for frequency-domain computer applications, these two subsets consist of the upper and lower halves of a set of equally spaced frequencies, and the output is selected according to whether the input is in the upper or lower half. Other ways of grouping the frequencies into two (or even more) subsets could also be used.

The principal difference, when various frequency-grouping systems are adopted, will appear in the detection-frequency source. One output frequency must be designated for each subset of possible input frequencies. For every possible input frequency, there must be a detection-frequency component which will combine with that input frequency to produce the corresponding designated output frequency. The frequency-domain switch will work if the combination which results, when the entire set of these detection frequencies is mixed with any possible input signal, always contains one component at one of the designated output frequencies, while all other components are at frequencies which are not designated output frequencies and can therefore be suppressed.

Obviously many modifications and variations of the present invention are possible in the light of the above teachings. It is therefore to be understood that within the scope of the appended claims the invention may be practiced otherwise than as specifically described.

What is claimed is:

1. A frequency domain switch comprising a source of multi-frequency detection signals, an input signal, said signal source adapted to produce a signal which simultaneously contains all of a number of frequency components, each of said frequency components being the difference between one of the desired output frequencies and one of the frequencies of a corresponding subset of possible frequencies of the input signal, any possible input frequency being a member of one of two subsets and the two subsets exhausting the set of possible input frequencies, also operable to be fed said input signal which may be at any one of a number of discrete frequencies which has a particular relationship to one of said plurality of discrete frequencies from said multi-frequency source, a modulator connected to said multi-frequency source and said input signal, said modulator being adapted to mix said signals for producing a large number of discrete heat frequencies at the sum and difference between said multi-frequency signals and any one of said input signals, a first filter connected to said modulator and adapted to pass a frequency which is the difference between two desired output frequencies, a local oscillator, said first filter and said local oscillator each being separately connected to a modulator and filter circuit, said modulator and filter circuit adapted to produce either one of two discrete output frequencies depending on the frequency of the input signal.

2. A frequency domain switch for examining random input signal frequencies which are within any one of two or more continuous bands of frequencies and produce a different frequency output for each band, comprising an input signal, a multi-frequency signal source for producing a signal which simultaneously contains all of a large number of discrete frequency components, each of said discrete frequency components being the difference between one of the desired output frequencies and one of the frequencies of a corresponding subset of possible frequencies of the input signal, said input signal being at any one of a number of random frequencies which has a paricular relationship to one of said plurality of discrete frequencies from said multi-frequency source, a modulator connected to said multi-frequency source and said input signal, said modulator being adapted to mix said signals for producing a large number of discrete beat frequencies at the sum and difference between said multi-frequency signals and any one of said random input signals, and means including a filter circuit adapted to pass at least one selected beat frequency which is common to at least one of the random input signals, said filter circuit being coupled with said modulator for producing an output signal at any one of a plurality of different discrete frequencies depending on the frequencies of the input signal, said filter circuit comprising a plurality of sharply peaked filters for separating frequency bands.

References Cited in the file of this patent

UNITED STATES PATENTS

| | | |
|---|---|---|
| 2,303,542 | Goddard | Dec. 1, 1942 |
| 2,710,920 | Appert et al. | June 14, 1955 |
| 2,796,585 | Freund | June 18, 1957 |
| 2,811,638 | Regnier | Oct. 29, 1957 |

FOREIGN PATENTS

| | | |
|---|---|---|
| 145,782 | Australia | Mar. 18, 1952 |
| 714,684 | Great Britain | Sept. 1, 1954 |